No. 758,921. PATENTED MAY 3, 1904.
A. C. JONES.
STOCK GUIDE.
APPLICATION FILED SEPT. 4, 1903.
NO MODEL.
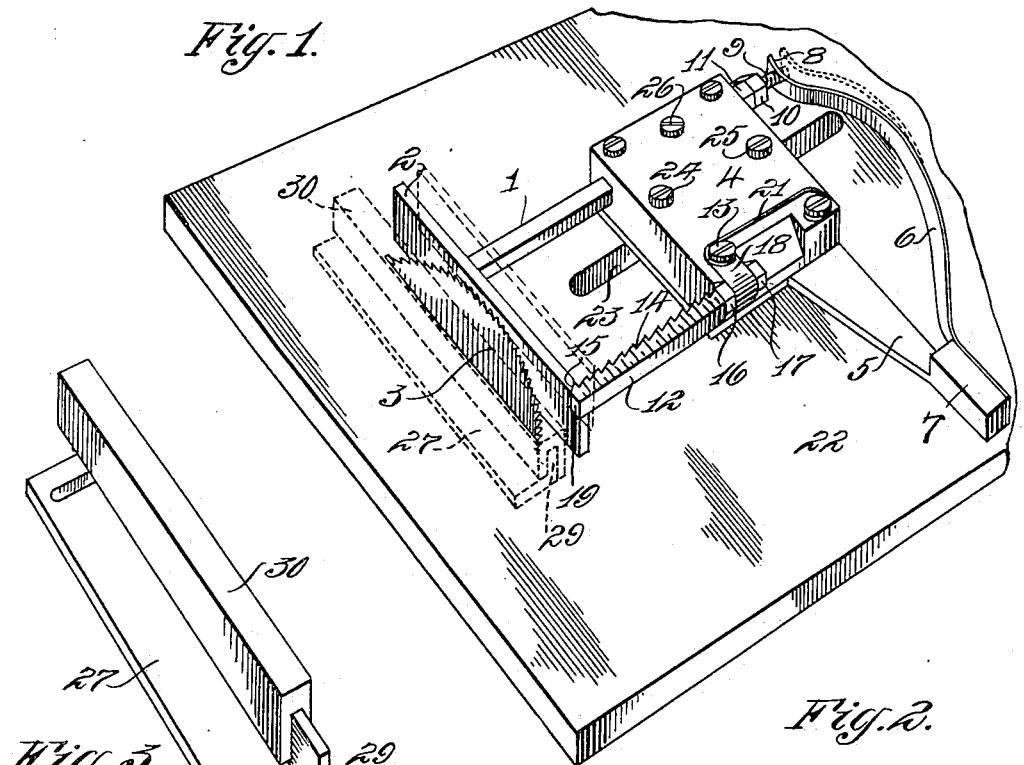
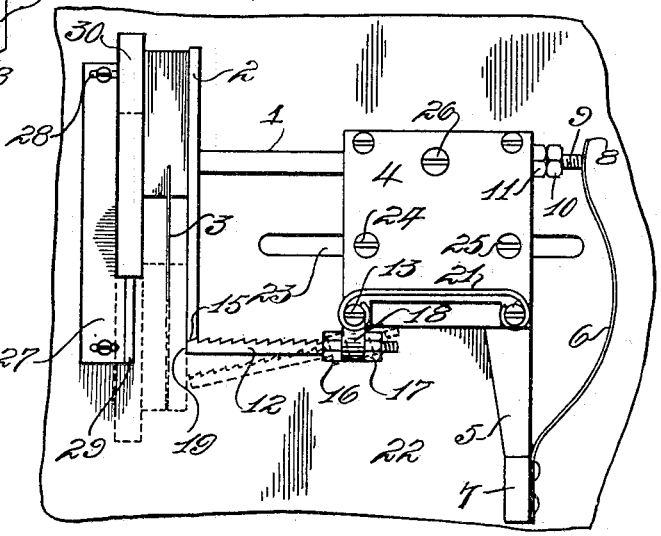
Witnesses:
Inventor:
Albano C. Jones.
By his Attorney,
Fred W. Barnacle.

No. 758,921. Patented May 3, 1904.

UNITED STATES PATENT OFFICE.

ALBENO CHARLES JONES, OF NEWARK, NEW JERSEY.

STOCK-GUIDE.

SPECIFICATION forming part of Letters Patent No. 758,921, dated May 3, 1904.

Application filed September 4, 1903. Serial No. 171,913. (No model.)

*To all whom it may concern:*

Be it known that I, ALBENO CHARLES JONES, a subject of the King of Great Britain, residing in the city of Newark, county of Essex, and State of New Jersey, have invented a new and useful Stock-Guide, of which the following is a specification.

This invention relates to stock-guides of an automatic class, and has for its objects to provide an automatically-adjustable guide, to set the guides at will either mechanically or by the stock, to insure the return of the guide to its initial position after each passage of the stock beyond it, to provide for the adjustment of a guide mechanism, and to produce an inexpensive, durable, and efficient structure.

Referring to the drawings forming a part of this specification, Figure 1 illustrates perspectively the improved guide mechanism in conjunction with a saw-table shown in parts. Fig. 2 is a plan view of the same, illustrating the parts displaced by the stock. Fig. 3 illustrates perspectively an auxiliary guide, and Fig. 4 is a transverse section of the same.

Similar characters of reference indicate like parts throughout the figures.

A primary feature comprises a movable member 1, upon which is mounted a stock-guide 2, which in the present instance is initially in a position near a stock-working member—such, for instance, as a circular saw 3. This movable member 1 is mounted preferably for reciprocation through a bearing 4, which is preferably fixed to a member 5, suitably extending beyond the bearing, as seen in Fig. 1. To or near the extremity of this extended member 5 is attached by suitable means a resilient member 6, preferably attached to a head-piece 7, secured to the extending member 5. This resilient member is preferably in the form of a pressure-spring, whose free end is so connected with the member 1 as to cause the latter to extend through the bearing 4 to an extreme position near the saw or working member. In the present instance the resilient member simply bears against the extremity 9 of the member 1, which projects beyond the face of the bearing 4, and this extended portion 9 may be threaded to receive adjusting-nuts 10 and 11, through the instrumentality of which the extent of projection of the stock-guide toward the working member may be determined.

For the purpose of arresting the stock-guide 2 in a predetermined relation to the working member or in a predetermined position in the path of movement thereof the rack-bar 12 is provided, which in the present instance is hinged, as at 13, to the bearing 4, and may be provided with a series of teeth 14 or their equivalent for engaging the stock-guide 2, which in the present instance is chamfered or beveled at one end, as at 15, to fit in said teeth 14, and this bar 12 is also provided with an adjustment in the form of adjusting-nuts 16 and 17 on each side of the hinged member 18, which carries the bar. Hence when the member 2 is adjusted by the nuts 10 and 11 the bar 12 may be correspondingly adjusted by nuts 16 and 17, so that the bar 12 if graduated to a scale may always be operative, even if the member 2 is adjusted to different settings—that is to say, the scale, if such be used, may always be useful by the compound adjustment of the two members. This bar 12 is designed to be tripped by the stock, so that when the latter is operated on by a stock-working member and has passed beyond the face of a stock-guide said guide may return to its initial position. To this end the extremity 19 of the bar 12 extends beyond the surface of the guide 2 and, as seen in Fig. 2, is tripped or forced back by the stock, whereupon the release of the guide is effected, and as soon as the stock passes beyond a predetermined point the guide, through the instrumentality of the resilient member 6, will fly back to its initial position. For the purpose of automatically returning the bar 12 to its position against the end 15 of the guide 2 I provide a resilient member 21, which is affixed at one end to the bearing 4, and the other to the hinged member 18, which latter member the resilient member actuates.

If desired, the saw-table 22 may be slotted, as at 23, so that the entire mechanism may be adjusted to and from the working member or saw, and for the purpose of fixing the bearing in a predetermined position on the table any suitable device, such as screws 24 and 25, may be employed. If desired, also, I may supply a set-screw 26 to arrest the member 2 in any position in the bearing, provided duplicate operations of the working member are desired.

It is sometimes desirable to cut the stock of varying dimensions in one direction, but that the dimensions thereof in the transverse direction be all the same. To this end I provide an auxiliary guide, which I place to the saw 3 on a side opposite the automatic guide. This guide comprises a plate 27, provided with slots 28. Secured thereto is a vertical guide 29, Figs. 3 and 4, upon which is mounted a sliding guide 30, the guide-face 31 of which extends to the table 22. This guide is especially adapted for cutting small stock. It will now be seen that if the automatic guide is used in connection with a circular saw, as shown, the stock may be cut in various widths and thicknesses without the necessity each time of resetting the guides, and that in the present instances the stock itself may be employed to force the guides back to a predetermined and desirable point. It will be further noted that unless the reverse is ordained by the setting of the guide in a predetermined position said guide after each passage therefrom of the stock will return to an initial position. It will be further noted that the entire guide mechanism may be adjusted at will upon the table.

Within the purview of this invention I reserve the right to all modifications of structure and operation, it being the primary design of this invention to provide an automatically-returnable stock-guide.

Having thus described my invention, I claim—

1. In combination with a saw-table, of a stock-guide adjustable to and from the plane of the saw, means tending to shift the guide toward the saw, means to temporarily hold the guide in any position, said means engageable by the work by its passage past the saw to disengage the guide to let it return to the saw.

2. A stock-guide comprising a reciprocatable guide, a bearing therefor, a resilient member adapted to press said guide automatically to an initial position, a member connected to said bearing and adapted to hold said guide in various predetermined positions with relation to the bearing, said member lying in the stock-path, and being releasable from the guide by the stock.

3. A stock-guide comprising a reciprocatable guide, a bearing therefor, a resilient member adapted to press said guide automatically to an initial position, a member adapted to hold said guide in various predetermined positions with relation to the bearing, said member lying in the stock-path, and being releasable from the guide by the stock.

4. A stock-guide comprising a reciprocatable guide, a bearing therefor, resilient means connected to said guide and bearing and adapted to return said guide to an initial position after the passage of the stock therefrom, a graduated member provided with devices for holding the guide in predetermined positions, said member lying in the stock-path and being releasable from the guide by the stock, and means to return said graduated member to its initial position.

ALBENO CHARLES JONES.

Witnesses:
FREDERICK W. BARNACLO,
E. JONES.